March 25, 1941.  R. T. CORNELIUS  2,236,243
THERMOMETER FOR BEER BARRELS
Filed April 17, 1939
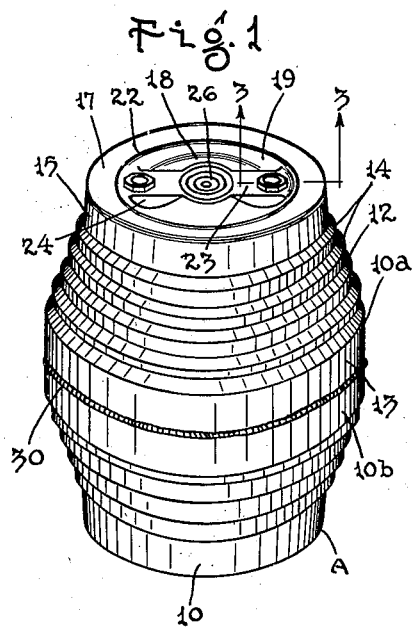
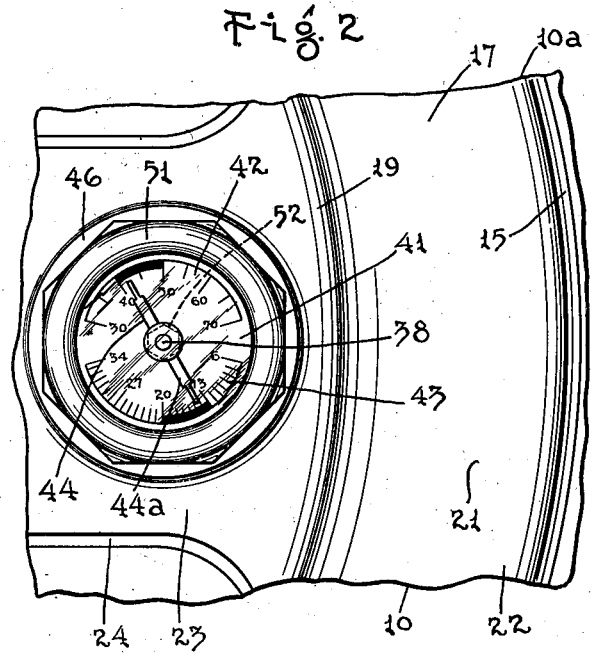
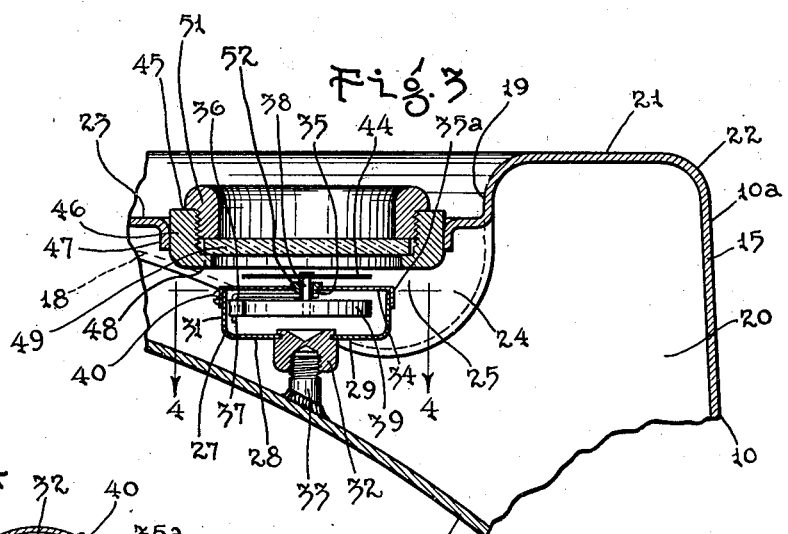
Inventor
Richard T. Cornelius
By Caswell & Lagaard
Attorneys Patented Mar. 25, 1941

2,236,243

UNITED STATES PATENT OFFICE 2,236,243

THERMOMETER FOR BEER BARRELS

Richard T. Cornelius, Minneapolis, Minn.

Application April 17, 1939, Serial No. 268,277

3 Claims. (Cl. 73—343)

My invention relates to beer barrels and particularly to beer barrels with thermometers permanently attached thereto.

An object of the invention resides in providing a beer barrel having a thermometer attached thereto, which thermometer will be unaffected in operation by the ambient temperature.

Another object of the invention resides in providing a beer barrel having an inner container and an outer shell spaced from one another and disposed out of heat conducting relation with respect to one another and in providing a thermometer arranged in heat conducting relation with respect to the container and out of heat conducting relation with respect to the shell.

A still further object of the invention resides in arranging the thermometer in the space between the container and shell and in heat conduction relation with respect to the container and in further providing a window in the shell through which the scale of the thermometer may be viewed.

An object of the invention resides in supporting the thermometer on the inner container in a manner so that the same is spaced from the shell and out of contact therewith.

Another object of the invention resides in constructing the thermometer with a metallic expansible member and in arranging said member in metallic contact with the container so as to procure rapid heat transfer therebetween.

A still further object of the invention resides in constructing the thermometer so that the same will indicate both the temperature within the container and also the pressure required to give the same degree of foaming when the beer is dispensed at the various temperatures.

Another object of the invention resides in constructing the thermometer with a movable member and with two scales, one of the scales being graduated in degrees temperature and the other in units of pressure.

Other objects of the invention reside in the novel combination and arrangement of parts and in the details of construction hereinafter illustrated and/or described.

In the drawing:

Fig. 1 is a perspective view of a beer barrel illustrating an embodiment of my invention.

Fig. 2 is a plan view of a portion of the structure shown in Fig. 1 and drawn to a greater scale.

Fig. 3 is an elevational sectional view taken on line 3—3 of Fig. 1 and drawn to the same scale as Fig. 4.

Fig. 4 is a plan sectional detail view taken on line 4—4 of Fig. 3.

In the handling of and dispensing of beer in metal barrels it is particularly desirable to ascertain the exact temperature of the beer within the barrel. Where the temperature varies, different amounts of pressure are required to dispense the beer with the same degree of foaming. The present invention provides a barrel utilizing a thermometer which is arranged to accurately give the temperature of the beer within the barrel and which is not affected by the ambient temperature and which will, at the same time, indicate the pressure required to produce the desired amount of foaming.

My invention comprises a barrel which I have indicated in its entirety by the reference character A. This barrel is constructed similar to the barrel disclosed in my co-pending application for patent for Barrels, Serial No. 266,330, filed on April 6, 1939. This barrel includes an outer shell 10 and an inner container 11 shown in Fig. 3, which parts are arranged in spaced relation to form a chamber 20 therebetween.

The shell 10 consists of two parts 10a and 10b which are substantially identical in construction. The part 10a is formed with a circumferential wall 12 having a cylindrical portion 13 and stepped portions 14 reducing the diameter of the barrel 10a at the head end of the barrel. At this locality the circumferential wall is formed with a conical portion 15 which is connected to a head 17. The head 17 has a spherical portion 18 which is connected to a cylindrical portion 19. The latter portion is connected to an annular planiform rim 21 which, together with the portions 19 and 15, form a chine for the barrel. This chine is designated by the reference numeral 22. Extending diametrally across the head 17 is a raised portion 23 which is tangent to the spherical portion 18 and which extends up to the wall 19 in proximity to the rim 21. This raised portion is connected by longitudinally extending walls 24 with the head proper to form spaces within the shell, indicated by the reference numeral 25. These spaces communicate with the space 20 of the barrel.

The container 11 is constructed spherical or spheroidal in form and consists of two parts welded or otherwise secured together. These parts are held spaced from the shell 10 by means of insulating rings, not shown in the drawing, or in any other suitable manner. Inasmuch as the construction used for this purpose does not form any particular feature of the invention, the same has not been illustrated in the drawing. After the container has been inserted into the shell the parts 10a and 10b are welded together as indicated at 30. In addition, one or more bungs 26 may be employed, the one illustrated being disposed in the raised portion 23 of the head 17. This bung is connected to the container 11 and serves to permit of filling and dispensing beer from the barrel.

The invention proper includes a thermometer 27 which is disposed within the space 25 and the space 20 and which is supported and mounted, as will be presently described. The thermometer 27 comprises a case 28 which has a bottom 29 and a circumferential wall 31 connected therewith. The bottom 29 has secured to it a threaded boss 32 which is adapted to be screwed upon a stud 33 welded to the container 11. Case 28 includes a cover 34 formed with a flange 35a fitting about the circumferential wall 31 of case 28. This cover is preferably constructed of metal and is secured to case 28 by means of screws 40. Rotatably mounted in the cover 34 is a bushing 35. Bushing 35 has secured to it an arm 36 formed at its outer end with a depending finger 37. Journalled in the bushing 35 is a shaft 38. A thermally responsive bi-metallic element 39, constructed as a ribbon and arranged in spiral form, is attached to the finger 37 of arm 36 at its outer end and to the shaft 38 at its inner end. As this member expands, shaft 38 is caused to rotate. The bushing 35 may be rotated by means of a wrench head 52, formed on said bushing so that the entire mechanism may be adjusted relative to the cover 34.

The cover 34, as shown in Fig. 2, has formed on it a face 41. This face may be embossed or printed directly on the cover and comprises two scales 42 and 43. The scale 42 is graduated in degrees of temperature, while the scale 43 is graduated in pounds pressure. Attached to the shaft 38, exteriorally of the cover 34, is a member providing two pointers 44 and 44a. The pointer 44 moves past the scale 42 and the other pointer 44a moves past the scale 43. The scales 42 and 43 are so designed that when the pointer 44 is indicating the temperature of the beer within the container 11, on scale 42, the pointer 44a indicates on scale 43 the corresponding pressure required to cause the desired foaming of the beer.

The face 41 of the thermometer 27 may be viewed through a window in the shell 10, which is indicated in its entirety by the reference numeral 45. This window includes a bezel 46 welded to an inturned flange 47 formed in the raised portion 23 of head 17. This bezel has an inwardly turned shoulder 48 upon which a window pane 49 rests. A clamp ring 51 screwed into the bezel 46 holds the pane 49 in position and forms a tight joint so that leakage of air through the window is prevented. If desired, gaskets may be used to prevent leakage. I have, however, found that by constructing the window pane of certain transparent semi-plastic material such as some of the phenol formaldehyde products, Celluloid or poly-styrene that these compositions give sufficiently to form a fluid-tight joint without the use of gaskets. The window 45 is situated directly above the thermometer 27 so that the face 41 may be readily viewed through the same. Also the stud 33 is of such a length that the pointer 44 lies immediately below the window pane 49, whereby the scale and pointer are readily seen.

It will be noted that the thermometer is constructed entirely out of metal and that all of the parts are arranged in metallic contact with one another and with the container 11. In this manner heat transfer between the container and moving element of the thermometer is very rapid. With the type of barrel illustrated, vacuum is maintained in the space 20 so that transfer of heat between the thermometer and the shell 10 by convection is prevented. It will thus be seen that the thermometer is highly responsive to the temperature of the container and contents and is unaffected by the ambient temperature.

My invention is highly advantageous in that an extremely simple and practical construction is provided whereby the condition of the beer within an evacuated beer barrel may be readily determined. The thermometer is in direct metallic contact with the beer container so that heat transfer between the movable member thereof and the beer container is very rapid. Injury to the outer shell or displacement of the outer shell relative to the container does not affect the operation of the thermometer since the same is solely supported on the inner container. By means of the window provided, the thermometer is readily read and the temperatures easily ascertained. The entire window is disposed within the confines of the chine 22 so that the same is fully protected from injury through the handling of the barrel. By removal of the clamping ring and the window pane, the thermometer may be adjusted whenever the occasion demands, or an entirely new thermometer substituted for the existing thermometer. With my invention the correct pressure to maintain in the barrel to correspond with the temperature of the beer is instantly ascertainable so that the beer may be properly dispensed regardless of the temperature in the barrel.

Changes in the specific form of my invention, as herein disclosed, may be made within the scope of what is claimed without departing from the spirit of my invention.

Having described my invention, what I claim as new and desire to protect by Letters Patent is:

1. In combination, a barrel comprising a container and a shell surrounding said container and spaced therefrom, an opening in said shell, a bezel secured to said shell and encircling said opening, a stud attached to said container and concentrically disposed relative to said opening, a thermometer having a socket adapted to be applied to said stud and axially movable along said stud, said thermometer being of dimensions less than the dimensions of said opening to permit of applying the thermometer to the stud through the opening, a window carried by said bezel, and a detachable clamp ring for securing the window in the bezel.

2. In combination, a barrel comprising a container and a shell surrounding said container and spaced therefrom, an opening in said shell, a threaded stud attached to said container opposite said opening, a thermometer insertable through said opening and into said space, said thermometer having a threaded portion adapted to be screwed on said stud, and a detachable window covering said opening.

3. In combination, a barrel comprising a container and a shell surrounding said container and spaced therefrom, an opening in said shell, a thermometer insertable into said space through said opening, and means capable of manipulation through said opening for attaching said thermometer to said container, and a detachable window covering said opening.

RICHARD T. CORNELIUS.